United States Patent
Kuchler

(10) Patent No.: US 7,213,452 B2
(45) Date of Patent: May 8, 2007

(54) DEVICE FOR MONITORING PHYSICAL VARIABLES OF A MOTOR VEHICLE WITH SUPPORTING ENERGY SUPPLY

(75) Inventor: Gregor Kuchler, Thalmassing (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 11/053,994

(22) Filed: Feb. 9, 2005

(65) Prior Publication Data

US 2005/0174225 A1   Aug. 11, 2005

(30) Foreign Application Priority Data

Feb. 9, 2004   (DE) .................... 10 2004 006 295

(51) Int. Cl.
*E01C 23/00*   (2006.01)
*B60C 23/02*   (2006.01)

(52) U.S. Cl. ....................................................... 73/146

(58) Field of Classification Search ................... 73/146
See application file for complete search history.

(56) References Cited

U.S. PATENT DOCUMENTS

| 4,657,289 | A | | 4/1987 | Boyer |
| 5,285,189 | A | * | 2/1994 | Nowicki et al. ............ 340/447 |
| 5,552,759 | A | * | 9/1996 | Stoyka .................. 340/426.33 |
| 6,175,784 | B1 | * | 1/2001 | Jicha et al. .................... 701/19 |
| 2004/0118197 | A1 | * | 6/2004 | Bulst et al. ..................... 73/146 |

FOREIGN PATENT DOCUMENTS

| DE | 44 02 136 C2 | 7/1995 |
| EP | 1 172 236 A2 | 1/2002 |

* cited by examiner

*Primary Examiner*—Max Noori
(74) *Attorney, Agent, or Firm*—Laurence A. Greenberg; Werner H. Stemer; Ralph E. Locher

(57) ABSTRACT

A device monitors a physical variable, in particular the tire pressure, of a wheel fitted on a vehicle. The device can be mounted on the wheel and contains an electrical energy source, a sensor for determining the physical variable to be monitored, a transmitter for transmitting a radio message which contains data supplied by the sensor, and an operations detector for generating an operation signal.

15 Claims, 2 Drawing Sheets

DEVICE FOR MONITORING PHYSICAL VARIABLES OF A MOTOR VEHICLE WITH SUPPORTING ENERGY SUPPLY

BACKGROUND OF THE INVENTION

Field of the Invention

The invention relates to a device for monitoring a physical variable, in particular the tire pressure, of a wheel fitted on a motor vehicle. The device can be mounted on the wheel and contains an electrical energy source, a sensor for determining the physical variable, a transmitter for transmitting a radio message that contains data supplied by the sensor, and an operations detector for generating an operation signal which indicates whether the vehicle is moving. A control device is connected to the energy source, the sensor, the transmitter and the operations detector. The control device is configured to disconnect the energy source electrically from the sensor and/or the transmitter or to place the sensor and/or transmitter in an energy saving mode in order to reduce the energy consumption when the vehicle is not moving.

For continuous monitoring of physical variables of wheels of a motor vehicle, sensors mounted on the wheel are frequently used which determine the monitoring variable and send it by way of a connected transmitter in each case by radio to a receiver fitted on the vehicle. In this situation, the receiver is connected to the electronic control system of the vehicle, which evaluates the data received from the wheel electronics.

If the data in question involves tire pressure data in particular, then the vehicle electronics can thus continuously supply the driver with information about the tire pressure and therewith prompt the driver to undertake service action when the tire pressure is too low or give the driver as early a warning as possible in the event of a hazardous situation being heralded by a drop in pressure, such as can occur for example in the case of a "burst" tire.

As a rule, such tire pressure monitoring systems contain non-replaceable batteries for supplying the electronic components. A dead battery therefore requires the labor-intensive and costly replacement of the entire electronics unit mounted in the wheel. For this reason, a plurality of approaches has already been pursued in order to extend the life of the battery as far as possible. As a rule, a switching element dependent on the wheel rotation is used which places the wheel electronics into a current saving mode or disables the wheel electronics completely when the wheel is at a standstill. For this purpose, however, additional components are required which detect the wheel rotation.

Alternatively, it is possible to dispense entirely with a battery and to supply the wheel electronics with energy from an external source, for example by inductive transfer. However, this has a relatively high requirement in terms of equipment, which is linked to significantly increased costs, and is technically not entirely simple to implement on account of the wheel rotation.

A further known possibility relates to the use of energy converters that convert movements of the wheel into electrical energy. The energy offered by such converters and thus the operational readiness and reliability of the wheel electronics is however heavily dependent on the driving situation in this case.

SUMMARY OF THE INVENTION

It is accordingly an object of the invention to provide a device for monitoring physical variables of a motor vehicle with a supporting energy supply which overcomes the above-mentioned disadvantages of the prior art devices of this general type, which has a particularly long-lasting and at the same time reliable energy supply source and which at the same time requires little outlay and is thus cost-effective.

With the foregoing and other objects in view there is provided, in accordance with the invention, a device for mounting on a wheel for monitoring a physical variable of the wheel fitted on a vehicle. The device contains an electrical energy source, a sensor for ascertaining the physical variable, a transmitter for transmitting a radio message containing data supplied by the sensor, and an operations detector for generating an operation signal indicating whether the vehicle is moving. The operations detector simultaneously is a generator converting mechanical energy into electrical energy and feeding the electrical energy into the electrical energy source. A control device is connected to the electrical energy source, the sensor, the transmitter and the operations detector. The control device is configured for disconnecting the electrical energy source electrically from the sensor and/or the transmitter and for placing the sensor and/or transmitter in an energy saving mode for reducing energy consumption when the vehicle is not moving. The solution is based on the principle of saving the available energy resources as far as possible and at the same time recharging them during operation. This is achieved by separating the energy source, as frequently as is possible without suffering a loss of reliability, from the loads and simultaneously charging up the energy source during operation. In addition, the same component is used in this situation for detecting a no-load phase and for generating electrical energy.

The solution according to the invention exhibits a wide range of advantages. The energy consumption is reduced as a result of disabling the electronics, or putting them in standby mode, as soon as they are not required. At the same time, the energy source is charged up continuously while the vehicle is moving. In this manner the life of the energy source and thus the replacement cycle of the entire wheel electronics can be significantly extended.

A particularly compact construction employing a particularly small number of components becomes possible as a result of the fact that the operation detector and the generator are one and the same element. This reduces not only the manufacturing costs but also reduces the failure probability on account of the reduction in complexity. In total, therefore, a range of cost savings are achieved and the reliability is significantly enhanced.

The generator is advantageously a mechanical-electrical converter that converts mechanical energy from vibrations and deformations of the wheel into electrical energy. This type of generator saves space, is reliable, and is effective even at a low rotational speed of the wheel.

In this situation, the generator preferably contains a piezo-element, in particular a piezo-electric coating or piezo-ceramic fibers. Utilization of the piezo-effect effectively exploits the vibrations/deformations, and the element can be developed in any desired form by way of a coating or fibers.

With regard to a different embodiment, the generator is a mechanical-electrical converter that converts mechanical energy from a rotational movement of the wheel into electrical energy. By this configuration, a higher performance level can be achieved and a well-proven method of generating electrical energy can be utilized, for which a great variety of favorably priced components are available.

The generator can be mounted on a rim of the wheel or on a tire. Both options offer an equally stable mounting capability and effective utilization of energy.

Upstream of the control device is preferably connected an evaluation device which is connected to the generator and is able to calculate on the basis of the electrical output from the generator and its variability with time a digital or continuous wheel rotation signal which serves as a criterion for the operational status of the vehicle. In this situation, the energy from the generator is assessed using the criterion best suited to the application in question to determine whether the vehicle is in operation. However, the continuous signal can also be used for other purposes over and above its function as a criterion for the operational status.

The electrical energy source advantageously contains a battery and a rechargeable energy storage facility, whereby the generator is connected only to the rechargeable energy storage facility and not to the battery. This separates the functionalities of the basic supply using the battery and the supplementary supply using the generator, whose energy production is buffered for later use. The two elements of the energy source can be optimally adapted to their differing requirements.

In an advantageous development of the method according to the invention further characteristics of the wheel movement are ascertained from the power output of the generator, in particular the wheel rotational speed, the centrifugal force or the intensity of the vibrations of the wheel. These criteria can on the one hand increase the accuracy for determining the operational status of the vehicle. On the other hand, parameters are ascertained which can be used in parallel thereto in order to increase the operational convenience and the safety of the vehicle.

The radio is preferably additionally used in order to ascertain the position of the wheel on the vehicle. A relationship between the information concerning the physical monitoring variable and the exact position of the monitored wheel significantly boosts the safety, servicing and convenience advantages already accompanying the monitoring of the physical variable.

Other features which are considered as characteristic for the invention are set forth in the appended claims.

Although the invention is illustrated and described herein as embodied in a device for monitoring physical variables on a motor vehicle with a supporting energy supply, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
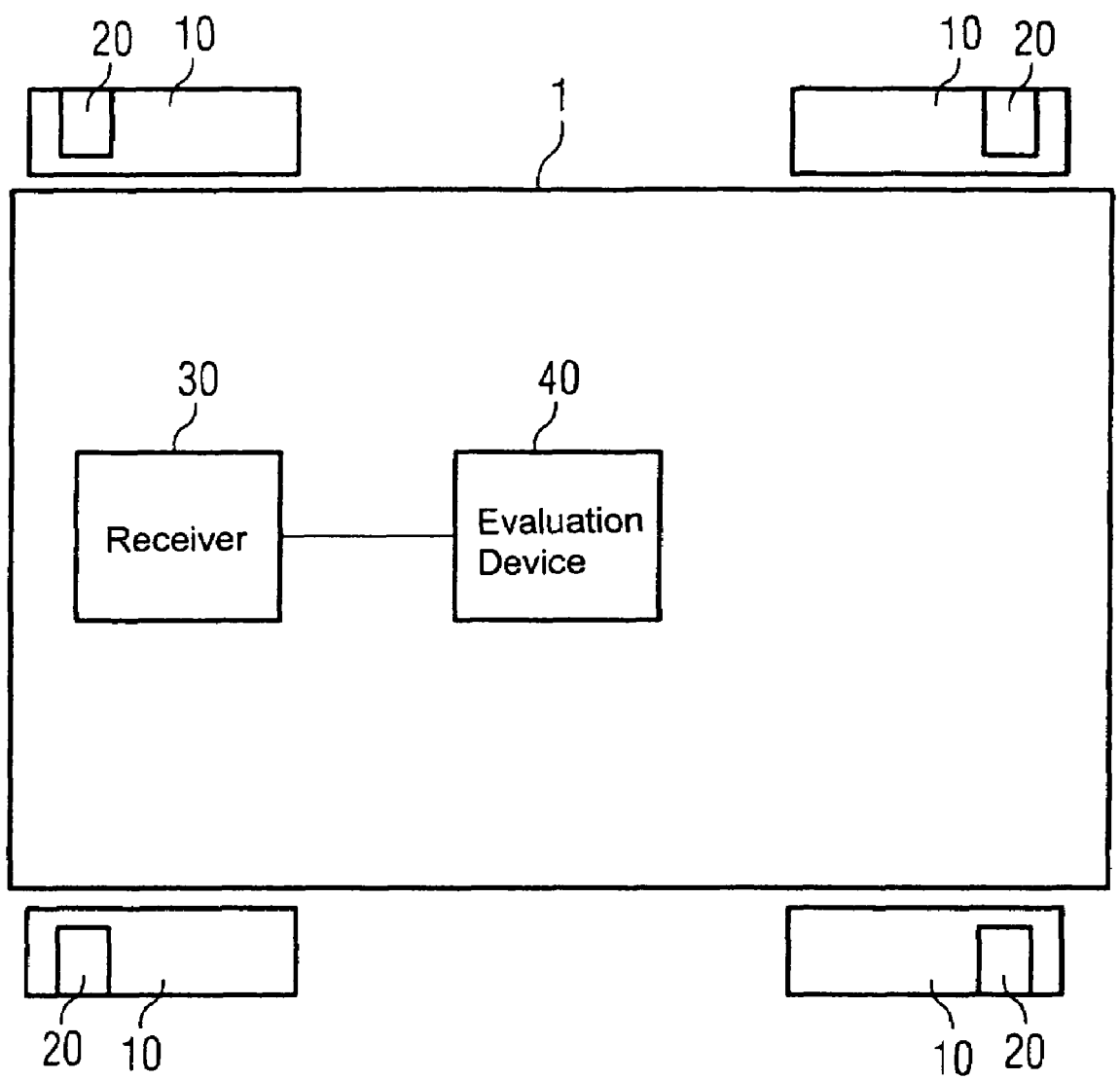
FIG. 1 is a schematic representation of a configuration containing electronics mounted on a vehicle and devices according to the invention mounted on each wheel.

Referring now to the figures of the drawing in detail and first, particularly, to FIG. 1 thereof, there is shown a vehicle 1 with four wheels 10, and has a configuration according to the invention for monitoring a physical variable. A wheel 10 as used throughout this application is defined to be the combination of the tire and the rim or wheel upon which the tire is mounted. A detection device 20 is provided in each of the wheels 10 for determining data concerning the physical variable to be monitored and for transmitting the data to the vehicle. The detection device 20 is described in more detail below in conjunction with FIG. 2.

A receiver 30 mounted on the vehicle receives the data and is connected to an evaluation device on the vehicle that is normally part of the electronic control system (ECU) of the vehicle. The basic structure of the configuration containing the wheel-mounted detection device 20 and vehicle-mounted receiver 30 with an evaluation device 40 is familiar to the person skilled in the art. It is also obvious that the invention is described here only by way of example of a four-wheeled private automobile, but can also be used for any other desired wheeled vehicles.

Figure 2:
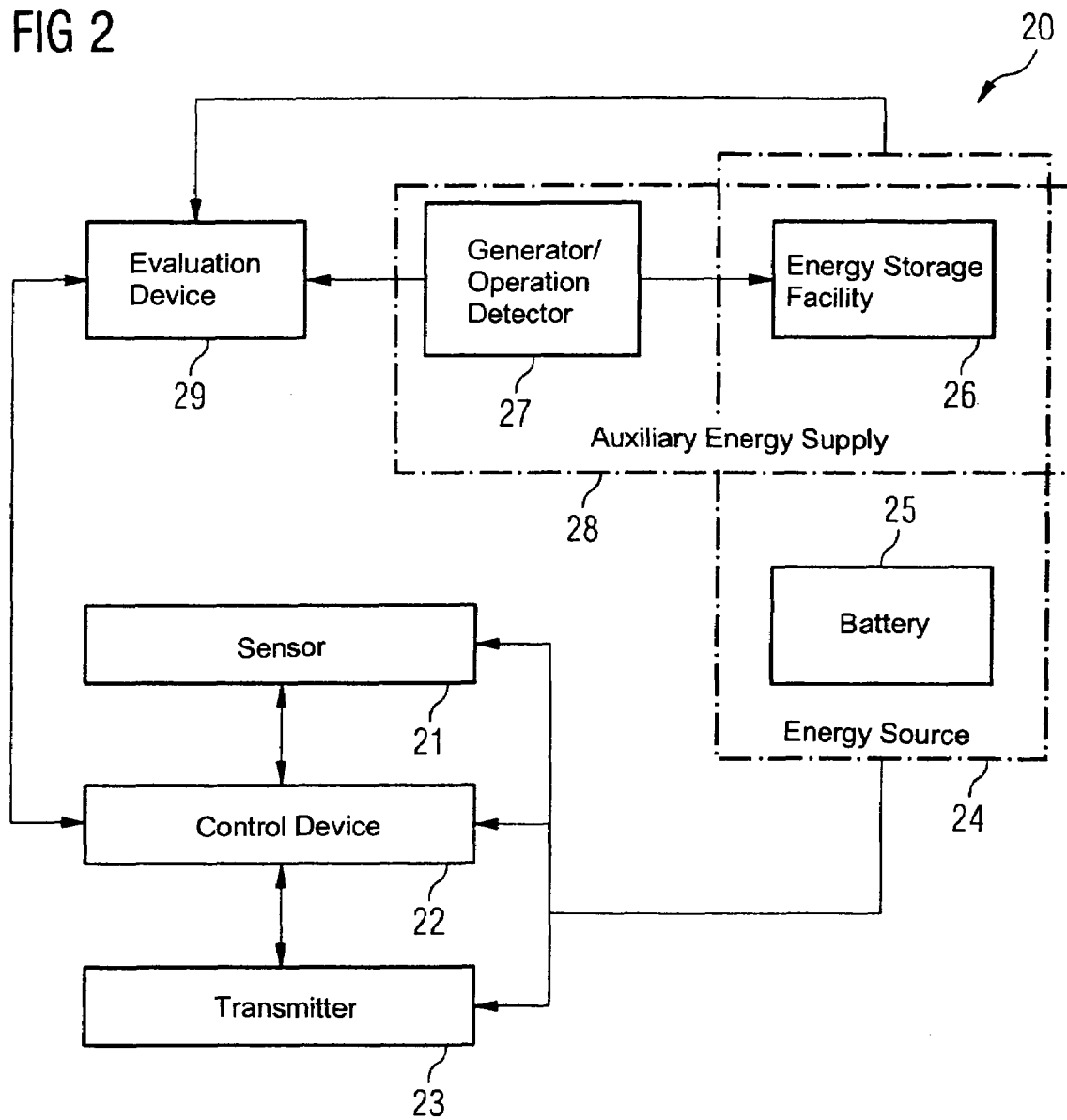
FIG. 2 is a block diagram of the structure of a device according to the invention, which is mounted on a wheel.

FIG. 2 shows the structure of the detection device 20. A sensor 21 ascertains the physical variable being monitored, such as the tire pressure of the wheel 10 for example. The data ascertained is transmitted to a connected control device 22 or is actively interrogated by the control device 22. By way of a transmitter 23 connected to the control device 22 the data is then transmitted in a radio message in order to be received by the vehicle-mounted receiver 30.

An energy source 24 is connected to the sensor 21, the control device 22 and the transmitter 23 in order to ensure the supply of electrical energy. The energy source 24 includes a battery 25 and a rechargeable energy storage facility 26. In this situation, the battery 25 serves as an energy buffer if the rechargeable energy storage facility 26 is unable to adequately supply the connected components.

A generator 27 feeds generated electrical energy into the energy storage facility 26. To this end, the generator 27 converts mechanical energy in the form of vibrations and/or tire deformations into electrical energy. A suitable element is possibly a piezo-electric element of the generator 27, which can be present for example in the form of a piezo-electric coating of a bending element (flexible carrier) or piezo-ceramic fibers. It is fundamentally possible to mount the generator in the tire or on the rim of the wheel 10. The former if need be enables a higher energy yield because the tire is subject to more intensive movements than the rim, whereas the latter is simpler in its construction and more reliable in its implementation. With the energy storage facility 26, the generator 27 forms an auxiliary energy supply 28 to relieve the load on the battery 25 and to extend its life.

The generator 27 is configured such that it simultaneously has the functionality of an operations detector. For this purpose it is connected to an evaluation device 29 which is situated upstream of the control device 22. The evaluation device 29 is also supplied from the connected energy source 24.

The evaluation device 29 assesses the energy supply available from the generator 27, therefore for example performs a measurement of the electrical output, from which it can be determined whether the wheel is rotating and thus whether the vehicle is in motion. The control device 22 receives a signal from the evaluation device 29 corresponding to the operational status and disconnects the energy source 24 from the sensor 21 and/or the transmitter 23 in order to save energy provided that the motor vehicle is not moving. The sensor 21 and/or transmitter 23 can also be placed into an energy saving (standby) mode by the control device 22, instead of disconnecting the connection with the energy source 24 as described.

When the vehicle is running, the generator 27 thus generates energy on the one hand, provided the wheel 10 is in motion. In addition to the pure supply of energy, the energy supplied by the generator 27 that varies with time can be interpreted as a sensor value that can be used to determine whether the wheel is in rotational motion or is at a standstill.

In this situation, already known circuits/algorithms in the evaluation device 29 can assess the energy supplied by the generator 27 and deliver as its output signal, for example, a digital decision criterion ("rotating"/"not rotating") or a continuously changing signal which can be approximately proportional to the wheel rotational speed. Depending on this sensor value, the control device 22 can activate or deactivate a current saving mode for the wheel electronics.

The generator signal, in other words the measured output produced by the generator 27 for example, can be used directly as an input signal for the evaluation device 29 or indirectly after being fed into the energy storage facility 26.

The implementation of the invention is not restricted to the examples described above but is equally possible in a large number of variants which fall within the scope of expert action Further variations of the described device 20 are thus possible. The generator 27 can thus also utilize the actual rotation of the wheel instead of the piezo effect in order to generate energy, in other words it can be a dynamo.

In the case of a continuously changing output signal from the evaluation device 29, the transmission of the output signal to the vehicle-mounted evaluation device 40 is possible for example for further utilization of the signal. The output signal could be further processed there, possibly in order to assign the wheel electronics to a wheel position.

Further items of information can be evaluated or simply displayed only to the user, such as for example when the output signal is proportional to the wheel rotation, the centrifugal force or a characteristic value for the wheel vibrations (RMS value, Root Mean Square). Which of such types of values the evaluation device 29 is able to calculate depends ultimately on the type of the generator 27 and the evaluation algorithms used.

In any case, the support for the battery 25 by the generator 27 and the energy storage facility 26 result in the advantage that the battery 25 has a considerably extended life and/or can be smaller and more favorably priced. In addition, the wheel rotational speed switch needed in the case of known solutions can be saved as a result of the dual function of the generator 27 as an operation detector, since the evaluation device 29 can naturally be integrated as a pure software conversion into the control device 22 that is present in any case.

This application claims the priority, under 35 U.S.C. § 119, of German patent application No. 10 2004 006 295.1, filed Feb. 9, 2004; the entire disclosure of the prior application is herewith incorporated by reference.

I claim:

1. A device for mounting on a wheel for monitoring a physical variable of the wheel fitted on a vehicle, the device comprising:

an electrical energy source being an electrical energy storage device for supplying other components with electrical energy;
a sensor for ascertaining the physical variable;
a transmitter for transmitting a radio message containing data supplied by said sensor;
an operations detector for generating an operation signal indicating whether the vehicle is moving, said operations detector simultaneously being a generator converting mechanical energy into electrical energy and feeding the electrical energy into said electrical energy source;
a control device connected to said electrical energy source, said sensor, said transmitter and said operations detector, said control device configured for disconnecting said electrical energy source electrically from said sensor and/or said transmitter and for placing said sensor and/or transmitter in an energy saving mode for reducing energy consumption when the vehicle is not moving; and
an evaluation device connected to said control device and to said generator, said evaluation device being able to calculate on a basis of the electrical energy output from said generator and its variability with time a digital or continuous wheel rotation signal serving as a criterion for an operational status of the vehicle.

2. The device according to claim 1, wherein said generator is a mechanicalelectrical converter for converting the mechanical energy from vibrations and deformations of the wheel into electrical energy.

3. The device according to claim 2, wherein said generator contains a piezo-element.

4. The device according to claim 1, wherein said generator is a mechanical-electrical converter converting the mechanical energy from a rotational movement of the wheel into electrical energy.

5. The device according to claim 1, wherein said generator is mounted on a rim or a tire of the wheel.

6. The device according to claim 1, wherein said electrical energy source contains a battery and a rechargeable energy storage facility, said generator is connected only to said rechargeable energy storage facility and not to said battery.

7. The device according to claim 3, wherein said piezo-element is selected from the group consisting of piezo-electric coatings and piezo-ceramic fibers.

8. The device according to claim 1, wherein the physical variable is tire pressure.

9. A configuration for monitoring a physical variable of a wheel fitted on a vehicle, the configuration comprising:

a device mounted on the wheel, the device including:
an electrical energy source being an electrical energy storage device for supplying other components with electrical energy;
a sensor for ascertaining the physical variable;
a transmitter for transmitting a radio message containing data supplied by said sensor;
an operations detector for generating an operation signal indicating whether the vehicle is moving, said operations detector simultaneously being a generator converting mechanical energy into electrical energy and feeding the electrical energy into said electrical energy source; and
a control device connected to said electrical energy source, said sensor, said transmitter and said operations detector, said control device configured for disconnecting said electrical energy source electrically from said sensor and/or said transmitter and for placing said sensor and/or transmitter in an energy saving mode for reducing energy consumption when the vehicle is not moving;

a vehicle-mounted receiver for receiving the radio message; and a vehicle-mounted evaluation device connected to said receiver.

10. The device according to claim 9, wherein the physical variable is tire pressure.

11. A method for monitoring a physical variable of a wheel fitted on a vehicle, the wheel having a sensor and a transmitter, which comprises the steps of:

determining an operational status of the vehicle on a basis of a motion state of the vehicle;

if the vehicle is moving, measuring the physical variable at the wheel using the sensor and transmitting a radio message containing information about the physical variable using the transmitter;

if the vehicle is not moving, performing one of:

interrupting an energy supply to the sensor and/or to the transmitter; and placing the sensor and/or the transmitter in an energy saving mode for reducing energy consumption;

converting mechanical energy from the wheel into electrical energy and storing the electrical energy for future operation of the sensor and/or of the transmitter and also for operation of possible further electrical components on the wheel;

measuring the electrical energy generated resulting in measured electrical energy; and using the measured electrical energy as a criterion in determining the operational status of the vehicle.

12. The method according to claim 11, which further comprises determining further characteristics of wheel motion of the wheel from the measured electrical energy.

13. The method according to claim 12, which further comprises selecting the further characteristics from the group consisting of wheel rotational speed, centrifugal force and intensity of vibrations of the wheel.

14. The method according to claim 11, which further comprises determining a position of the wheel on the vehicle from information derived from the radio message.

15. The method according to claim 11, which further comprises measuring tire pressure as the physical variable.

* * * * *